April 29, 1930.  G. D. RYTHER  1,756,136
SECTIONAL DRIVE OR CONVEYER CHAIN
Filed July 13, 1927
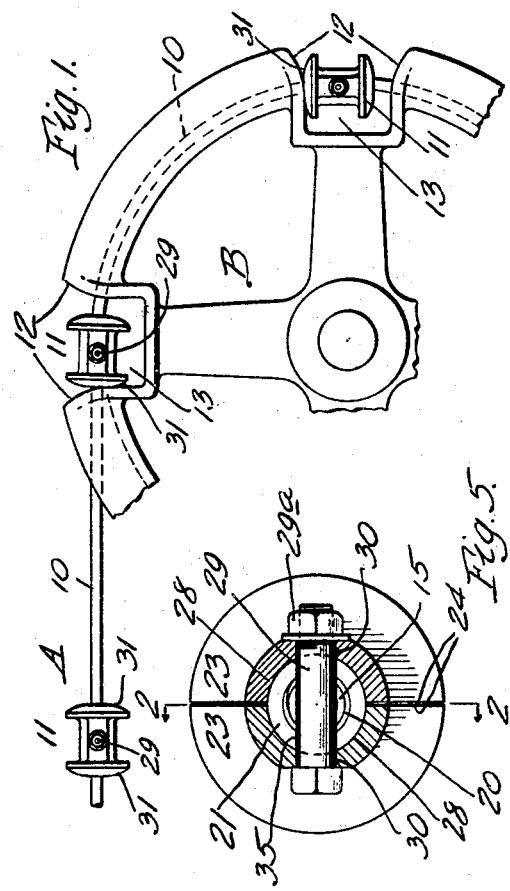
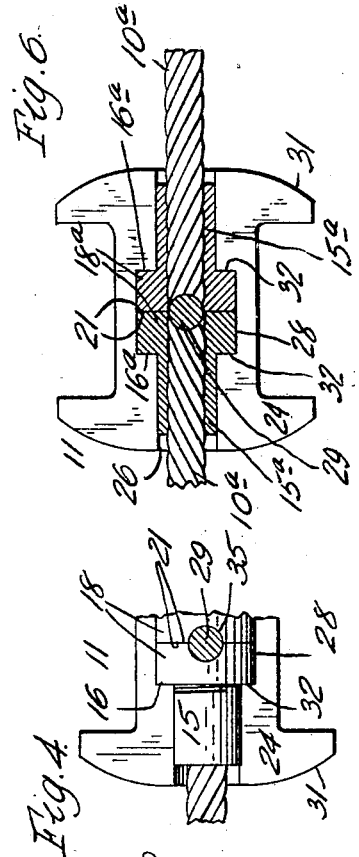
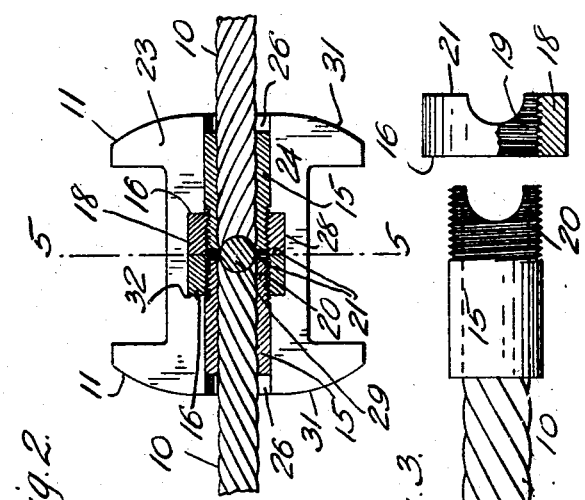
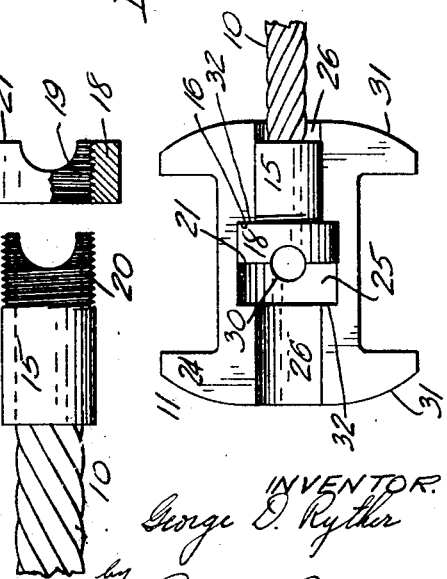
INVENTOR.
George D. Ryther
by Parker & Prochnow
ATTORNEYS.

Patented Apr. 29, 1930

1,756,136

UNITED STATES PATENT OFFICE

GEORGE D. RYTHER, OF CARTHAGE, NEW YORK

SECTIONAL DRIVE OR CONVEYER CHAIN

Application filed July 13, 1927. Serial No. 205,375.

This invention relates to improvements in cable driving chains or conveying appliances, and more particularly to a sectional drive or conveyer chain or cable.

One type of drive or conveyer chain now in use comprises a continuous or endless, flexible wire cable upon which is secured a plurality of flights or elements which are formed to enter equally spaced recesses or gaps in the peripheries of the drive wheels, pulleys or sprockets over which they pass.

The flights or elements engage successively against bearing faces of the gaps of the drive wheel or wheels, the flights being initially secured on the cable so that they are correctly spaced for proper contact with said bearing faces. However, the cables eventually stretch somewhat in use with the result that the flights do not properly engage these faces, necessitating readjustment of the flights. Also should a cable break, much labor is required, especially with long chains, to remove the same for repairing the damage.

An object of the present invention is to improve and simplify flexible driving chains or conveying appliances.

Other objects are to provide an improved sectional driving chain or cable in which the effective lengths of the sections can be predetermined and maintained in use; also to construct a chain or cable of this sort having adjustable means for permitting the required length of the sections to be initially provided, and wherein likelihood of change in the effective length is reduced to a minimum, and whereby should change in the length occur, the same can be easily and quickly corrected by appropriate manipulation of said adjustable means; also to provide a sectional chain or cable in which the sections can be readily assembled, removed and replaced.

Other objects are to provide improved devices for coupling the sections of the chain or cable together; also to provide said coupling devices with means for preventing relative rotation between adjacent sections and between said sections and said coupling devices, and also to improve flexible driving chains or conveying appliances in the other respects hereinafter set forth and claimed.

In the drawings:

Fig. 1 is a fragmentary, side elevation of a portion of a sectional chain or conveying appliance embodying the invention, showing the same in operative relation to a part of a drive wheel or pulley.

Fig. 2 is a longitudinal sectional elevation on line 2—2, Fig. 5, of the adjacent ends of two sections of the chain and the coupling device for connecting them.

Fig. 3 is a fragmentary view of one end of a section with the adjustable sleeve detached.

Fig. 4 is a face view of portions of two of the coupling devices and one section of cable in operative relation to and extending between them.

Fig. 5 is a transverse, sectional elevation on line 5—5, Fig. 2.

Fig. 6 is a view similar to Fig. 2 showing a slightly modified form of cable or chain section.

The sectional drive chain or conveying appliance embodying the invention shown in the drawings comprises a plurality of separate sections 10, preferably of substantially equal length detachably connected or coupled together end to end by coupling devices 11 to form a continuous length of chain A. The coupling devices 11 are intended to act as driving elements in cooperation with the bearing surfaces 12 forming the sides of spaced gaps 13 on the periphery of any suitable drive wheel or pulley B, see Fig. 1. The couplings 11 can also be used as conveyer flights or connections, one or more of the chains being used side by side as a conveying appliance.

Each chain section 10 is composed of a length of suitable material, such for example as spirally twisted wire rope or flexible cable formed or provided at each end with a part for the connection of adjacent ends of other sections by the couplings 11.

In the construction shown in Figs. 1-5, the ends of each section 10 are provided with longitudinally extending collars 15 which can be firmly secured to the section in any suitable manner, as by hydraulic pressure. Each collar is provided with an abrupt, outwardly extending, preferably annular shoulder 16. The shoulder at one end of each section 10 faces the corresponding shoulder at the other end of the same section.

The shoulders 16 can be provided in any suitable way. For example, in the construction shown in Figs. 1–5, each shoulder is formed by the inner, transverse wall of a sleeve or part 18 which has a threaded axial bore or hole 19 and is received on a complementary external thread 20 extending longitudinally of the outer portion of each collar 15. In the modified form shown in Fig. 6, a shoulder 16$^a$ is provided by the formation of a head or enlargement 18$^a$ integrally with a collar 15$^a$ secured to each section 10$^a$.

In both constructions the extreme end of the completed section 10 and 10$^a$ respectively terminates in an abrupt transverse face or end wall 21 formed in the first case by the end of the sleeve 16, and in the other by the outer end of the head 18$^a$ of the collar 15$^a$.

Each coupling member or device 11 is preferably divided lengthwise into two halves or parts 23 having abutting faces 24 in each of which is formed a recess 25 intermediate of the ends of the part 23, and extending longitudinally or axially of said part from the recess to each end thereof is a groove or opening 26. The two halves of the coupling are brought together about the adjacent ends of two sections, with their faces 24 abutting, thus forming a pocket 28 for the reception of the two sleeves 16, Figs. 1–5, on said ends or the two heads 18$^a$ of Fig. 6, while the complementary grooves 26 form holes or bores for the reception of the reduced or collar portions 15 or 15$^a$. The two halves 23 of the coupling can be detachably secured together in any suitable manner, as by the use of a bolt or pin 29 which extends transversely through complementary holes 30 in said halves, the parts being secured by a nut 29$^a$.

The opposite outer ends or walls of the coupling device are formed to provide bearing faces 31 for engagement with the bearing portions 12 of the wheel or member B, see Fig. 1, in a manner similar to the bearing faces of the flights or parts now in use in continuous cable chains or conveyers.

It is obvious that in order to obtain proper and effective operation of the chain or sectional cable, the pitch between the couplings, or in other words the distance between the corresponding bearing faces 31 should be maintained in use, as otherwise the stresses would be unequally borne by the individual members of groups of couplings or driving elements which successively move into operative relation to the driving wheels or pulleys. For example, the cable sections may eventually stretch after being in use for some time, and further, there is a tendency of such cables when under stress, to rotate, caused by the effort of the strands thereof to straighten out, thus causing the length of the sections to increase.

It will be noted that inasmuch as the sleeves 18 have threaded connection with the collars 15, Figs. 1–5, these sleeves may, by appropriate rotation, be adjusted lengthwise of the sections, thereby permitting the shoulders 16 of each section to be disposed in exact predetermined relation and precisely the same distance apart on each section. If now, these shoulders are maintained in this definite relation and also in relation to the bearing faces 31 of the couplings 11, the pitch between the different couplings can be retained, and proper driving conditions assured.

To permit this result, each of the pockets 28 has its end walls formed to provide abrupt, transverse shoulders 32 against which the shoulders 16 abut, and the distance between said shoulders 32 of each coupling is such that the sleeves 18 at the adjacent ends of two sections, that is the two sleeves in any one of the pockets 28 are held therein with their outer end faces 21 in contact. By this arrangement, no end play or relative endwise movement is possible either between the sections or between the sections and their coupling devices.

To prevent relative rotation between the sleeves 18 and the sections to which they are attached, such as would cause a change in the distance between the shoulders 16 of the sections, and to prevent relative rotation between the sections and the couplings, the outer face 21 of the sleeves 18 and the corresponding ends of the collar 15 are grooved transversely, forming an aperture or hole 35 between the adjacent ends of two sections, and a suitable part on the coupling, such as the bolt or pin 29, is engaged therein. In this manner a single element serves the purpose of connecting the two halves of each coupling and also holds the ends of the sections to which it is coupled from turning relatively to each other and to said coupling. Thus, the cable sections are prevented from increasing their length by unwinding, but should the sections stretch slightly, the couplings can be detached to permit the sleeves 18 to be adjusted to bring the shoulders 11 of the sections closer together.

In the construction shown in Fig. 6 this last mentioned adjustable feature is absent. This construction, however, provides a less expensive appliance adapted for light operation.

It will be obvious that if desired, the two forms of the invention shown could be embodied in a single structure, that is, each section of the cable or chain may have the adjustable sleeve 18 at one end, and the integral collar 15$^a$ and head 18$^a$ at the other.

The sectional chain, cable or conveying appliance described is very economical to produce, is practical and efficient in operation, and should a section break, the same can be removed and replaced readily without dismantling the installation.

I claim as my invention:

1. In a conveyer chain the combination of a plurality of sections of flexible twisted strand cable of substantially equal length arranged end to end, a collar fixed on each end of each section and which is provided with an external thread, a sleeve having an abrupt transverse shoulder and having a threaded bore formed to engage said thread on said sleeve to permit rotative movement and lengthwise adjustment of said sleeve along said collar, whereby the shoulders at the ends of each cable section may be located a predetermined distance apart, and a plurality of coupling devices for connecting the adjacent ends of the cable sections, each of said devices having a part engageable with parts on the two sleeves on adjacent ends of two sections to positively prevent relative rotation therebetween, whereby said predetermined distance between the shoulders on each section is maintained in the use of the conveyer chain.

2. In a conveyer chain the combination of a plurality of sections of flexible twisted strand cable of substantially equal length arranged end to end, a collar fixed on each end of each section and which is provided with an external thread, a sleeve having an abrupt transverse shoulder and having a threaded bore formed to engage said thread on said sleeve to permit rotative movement and lengthwise adjustment of said sleeve along said collar, whereby the shoulders at the ends of each cable section may be located a predetermined distance apart, and a plurality of coupling devices for connecting the adjacent ends of the cable sections, each of said devices having parts interfitting with parts on the sleeves and collars respectively on the adjacent ends of two sections to positively prevent relative rotation between the sleeves and collars, and also between adjacent pairs of sleeves, whereby said predetermined distance between said shoulders on each cable section is maintained, and untwisting of the strands of the cable sections is prevented in the use of the conveyer chain.

3. In a conveyer chain the combination of a plurality of relatively short sections of twisted strand cable of substantially equal length arranged end to end, a collar fixed on each end of each of said sections, a sleeve threaded on each collar for adjustment lengthwise relatively to said cable section, a plurality of coupling devices, each connecting the adjacent ends of two cable sections and having a pocket in which the collars and sleeves on said ends are received, said sleeves and collars having transverse grooves at their outer ends, and a transverse element on said coupling device which enters said grooves and prevents relative rotation between said sleeves and collars, and also between the conveyer chain sections whereby untwisting of said strands and corresponding change in the length of said sections is prevented when in use.

4. In a conveyer chain the combination of a plurality of relatively short sections of twisted strand cable of substantially equal length arranged end to end, a collar fixed on each end of each cable section, each collar having an abrupt transverse shoulder facing the shoulder of the corresponding collar of the same cable section and which is disposed at a predetermined distance therefrom, each collar also having an abrupt outer end, a plurality of coupling devices, each connecting the adjacent ends of two cable sections, bearing faces at opposite ends of each of said coupling devices for engagement with equally spaced parts on a suitable driving element, a pocket formed in said device and having opposed transverse end walls forming abrupt shoulders against which said abrupt shoulders on said two coupled ends of said cable sections engage, and said cable ends and said couplings having interfitting parts for maintaining said transverse shoulders in contact with said transverse end walls in use, whereby said bearing faces on said couplings are maintained in predetermined fixed relation for proper engagement with said spaced parts of said driving element in the use of said conveyer chain.

5. A sectional conveyer chain comprising a plurality of relatively short sections of flexible twisted strand cable arranged end to end, coupling means for detachably connecting abutting ends of said sections to form a chain, said coupling means and the coupled ends of said sections having interengaging parts which cooperate to positively prevent relative turning of said coupled ends while connected, whereby untwisting of the strands of the cable sections is avoided.

6. A sectional conveyer chain comprising a plurality of relatively short sections of flexible twisted strand cable of substantially equal length arranged end to end, each section having at both ends an abrupt rigid shoulder, the shoulders on each section being disposed a predetermined distance apart, a plurality of coupling devices, each of which detachably connects the adjacent ends of two sections, each coupling device having parts cooperating with the shoulders of adjacent coupled ends of said sections for positively preventing lengthwise shifting of said ends away from each other, whereby said predetermined distances between the shoulders are maintained, and said coupling device and the corresponding coupled ends of said sections also having interengaging parts which positively prevent relative turning of the ends of said sections, whereby untwisting of the strands and consequent change in the length of said sections is prevented.

7. A sectional cable comprising a plurality of sections of flexible twisted strand cable arranged end to end, a collar fixed at each end of each section and having a transverse annular face, coupling devices extending about and connecting the adjacent ends of said sections and each of which is split into two parts lengthwise of said sections, each coupling having end thrust faces and interior recesses formed with transverse annular shoulders, and said collars on said sections being received in said recesses with said transverse annular faces thereof cooperating with said annular shoulders in said recesses for transmitting driving strains from said thrust faces of said couplings to said faces on said section sleeves, and means for rigidly securing the two parts of each of said couplings together.

8. A sectional cable comprising a plurality of sections of flexible twisted strand cable arranged end to end, a collar fixed at each end of each section and having a transverse annular face, coupling devices extending about and connecting the adjacent ends of said sections and each of which is split into two parts lengthwise of said section, each coupling having end thrust faces and interior recesses formed with transverse annular shoulders, and said collars on said sections being received in said recesses with said transverse annular faces thereof cooperating with said annular shoulders in said recesses for transmitting driving strains from said thrust faces of said couplings to said faces on said section sleeves, means for rigidly securing the two parts of each of said couplings together, and interfitting parts on said coupling and on said cable sections for preventing relative rotation between said couplings and said cable sections whereby untwisting of the strands of said sections is avoided.

9. A sectional cable comprising a plurality of sections of flexible twisted strand cable arranged end to end, a collar fixed at each end of each section and having a transverse annular face, coupling devices extending about and connecting the adjacent ends of said sections and each of which is split into two parts lengthwise of said sections, each coupling having end thrust faces and interior recesses formed with transverse annular shoulders, and said collar on said sections being received in said recesses with said transverse annular faces thereof cooperating with said annular shoulders in said recesses for transmitting driving strains from said thrust faces of said couplings to said faces on said section sleeves, means for rigidly securing the two parts of each of said couplings together, which means cooperate with parts on said sleeves to prevent relative rotation between said couplings and said cable sections whereby untwisting of the strands of said sections is avoided.

GEO. D. RYTHER.